US012406636B2

(12) United States Patent
Liu et al.

(10) Patent No.: US 12,406,636 B2
(45) Date of Patent: Sep. 2, 2025

(54) DISPLAY PANEL

(71) Applicant: AUO Corporation, Hsinchu (TW)

(72) Inventors: Xin Liu, Kunshan (CN); Jing Li, Kunshan (CN); Chun-Da Tu, Hsin-Chu (TW); Fu Liang Lin, Hsin-Chu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/274,628

(22) PCT Filed: May 24, 2022

(86) PCT No.: PCT/CN2022/094616

§ 371 (c)(1),
(2) Date: Jul. 27, 2023

(87) PCT Pub. No.: WO2023/193329

PCT Pub. Date: Oct. 12, 2023

(65) Prior Publication Data

US 2025/0087178 A1 Mar. 13, 2025

(30) Foreign Application Priority Data

Apr. 7, 2022 (CN) ........................ 202210362940.X

(51) Int. Cl.
*G09G 3/36* (2006.01)

(52) U.S. Cl.
CPC .................................. *G09G 3/3677* (2013.01)

(58) Field of Classification Search
CPC .................................................... G09G 3/3677
See application file for complete search history.

(56) References Cited

U.S. PATENT DOCUMENTS

| | | | | |
|---|---|---|---|---|
| 6,580,486 B1 | | 6/2003 | Sekine | |
| 9,697,786 B2 | | 7/2017 | Lee | |
| 2008/0024407 A1* | | 1/2008 | Yamaguchi | G09G 3/3648 345/87 |
| 2008/0204619 A1* | | 8/2008 | Saitou | G02F 1/136204 257/E27.009 |
| 2014/0332769 A1* | | 11/2014 | Lee | H10K 59/126 257/40 |
| 2017/0090652 A1* | | 3/2017 | Sato | G06F 3/044 |
| 2018/0226467 A1* | | 8/2018 | Ka | H10K 59/131 |
| 2019/0333461 A1* | | 10/2019 | Kikuchi | H10D 30/6755 |

(Continued)

FOREIGN PATENT DOCUMENTS

| | | | |
|---|---|---|---|
| CN | 102566168 B | 11/2014 | |
| CN | 104597678 A | 5/2015 | |

(Continued)

*Primary Examiner* — David Tung
(74) *Attorney, Agent, or Firm* — WPAT, PC

(57) ABSTRACT

The invention provides a display panel, comprising: a substrate having a peripheral area and a display area adjacent to each other, the display area provided with a plurality of pixel units; a gate driving unit provided in the peripheral area; a connection unit provided between the gate driving unit and the display area, and electrically connected to the gate driving unit and the plurality of pixel unit; and a shielding unit provided on the connection unit; wherein a projection area of the connection unit on the substrate corresponds to a projection area of the shielding unit on the substrate, and the shielding unit is electrically connected to a fixed potential.

10 Claims, 4 Drawing Sheets

(56) References Cited

U.S. PATENT DOCUMENTS

| | | | | |
|---|---|---|---|---|
| 2020/0192170 | A1* | 6/2020 | Abe | G09G 3/3677 |
| 2021/0191549 | A1* | 6/2021 | Kim | G06F 3/0412 |
| 2023/0102513 | A1 | 3/2023 | Xiao | |

FOREIGN PATENT DOCUMENTS

| | | | |
|---|---|---|---|
| CN | 107065365 | A | 8/2017 |
| CN | 109976056 | A | 7/2019 |
| TW | 201930988 | A | 8/2019 |

* cited by examiner

DISPLAY PANEL

BACKGROUND

1. Field of the Invention

The disclosure relates to a display panel, and particularly to a narrow bezel display panel.

2. Related Art

With development of science and technology, the display panel is widely applied to many electronic products, such as, mobile phones, tablet computers, watches, and the like.

In the existing display panel, the demand for narrow bezels becomes stronger, such that conversion connection between gate driving circuits and pixel units is closer to a display area. If contact holes among different metal layers are used to achieve the conversion connection, a layer of mask and a making procedure will be added, necessarily causing reduction of production efficiency and improvement of cost. Generally, the contact holes are replaced by first transparent conductive layers to achieve transition between the metal layers.

However, when using the first transparent conductive layer to achieve transition, since a distance between the first transparent conductive layer and the pixel unit is too close, and a voltage in the gate driving circuit is switched between 15V and −12V at each frame, the first transparent conductive layer in a transition area and a second transparent conductive layer of the pixel unit form a negative voltage electric field, and electric field effect will cause the originally arranged liquid crystals to redirect, causing light leakage due to incomplete redirection of the liquid crystals or no response of the redirection, and then easily producing bright spots on long edges of the display panel.

Therefore, how to provide a display panel that is made conveniently and can avoid bright spots produced on long edges is actually one of the problems to be solved.

SUMMARY

The embodiments of the invention provide a display panel, which can better avoid light leakage and bright spots produced, and improve display quality and yield of the products on the basis of reducing the production cost and decreasing the making procedure.

In one embodiment of the invention, a display panel comprises: a substrate having a peripheral area and a display area adjacent to each other, the display area provided with a plurality of pixel units; a gate driving unit provided in the peripheral area; a connection unit provided between the gate driving unit and the display area, and electrically connected to the gate driving unit and the plurality of pixel units; and a shielding unit provided on the connection unit; wherein a projection area of the connection unit on the substrate corresponds to a projection area of the shielding unit on the substrate, and the shielding unit is electrically connected to a fixed potential.

In the display panel, the connection unit is electrically connected to a second metal layer in the gate driving unit and a first metal layer in the plurality of pixel units.

In the display panel, the plurality of pixel units include a first number of rows of pixel units, the connection unit includes a second number of connection structures, the second number is matched with the first number, and each connection structure is connected to one row of pixel units.

In the display panel, the gate driving unit has a first gate driving circuit located on one side of the display area, and a second gate driving circuit located on the other side of the display area.

In the display panel, the connection unit comprises a first transparent conductive layer.

In the display panel, the shielding unit comprises a first portion, and a second portion covering the connection unit and comprising a second transparent conductive layer.

In the display panel, the first portion is connected to a conductive layer of the peripheral area and the second portion, and the first portion comprises a first transparent conductive layer.

In the display panel, the plurality of pixel units comprises a second transparent conductive layer.

In the display panel, the shielding unit has a first end and a second end opposite to each other, the first end is close to the display area, the second end is close to the gate driving unit, and the first end extends towards the display area and goes beyond the connection unit.

In the display panel, the second end is electrically connected to a conductive layer of the peripheral area.

In the display panel, the fixed potential is low potential.

In the display panel, the low potential is earth potential or common potential.

In the display panel, the second end extends towards the gate driving unit and goes beyond the connection unit.

In the display panel of the invention, the gate driving unit is electrically connected to the plurality of pixel units through the connection unit, and by virtue of design of the shielding unit, a negative voltage electric field between the connection unit and the plurality of pixel units can be better shielded, thereby avoiding light leakage in the display area due to incomplete redirection of the liquid crystals or no response of the redirection, then avoiding bright spots produced on edges of the display panel, and improving display quality of the display panel.

Hereinafter the invention is described in details combining with the accompanying drawings and the specific embodiments, but the invention is not limited thereto.

DETAILED DESCRIPTION OF THE EMBODIMENT

Hereinafter structure principle and working principle of the invention are described in details combining with the accompanying drawings.

Figure 1:
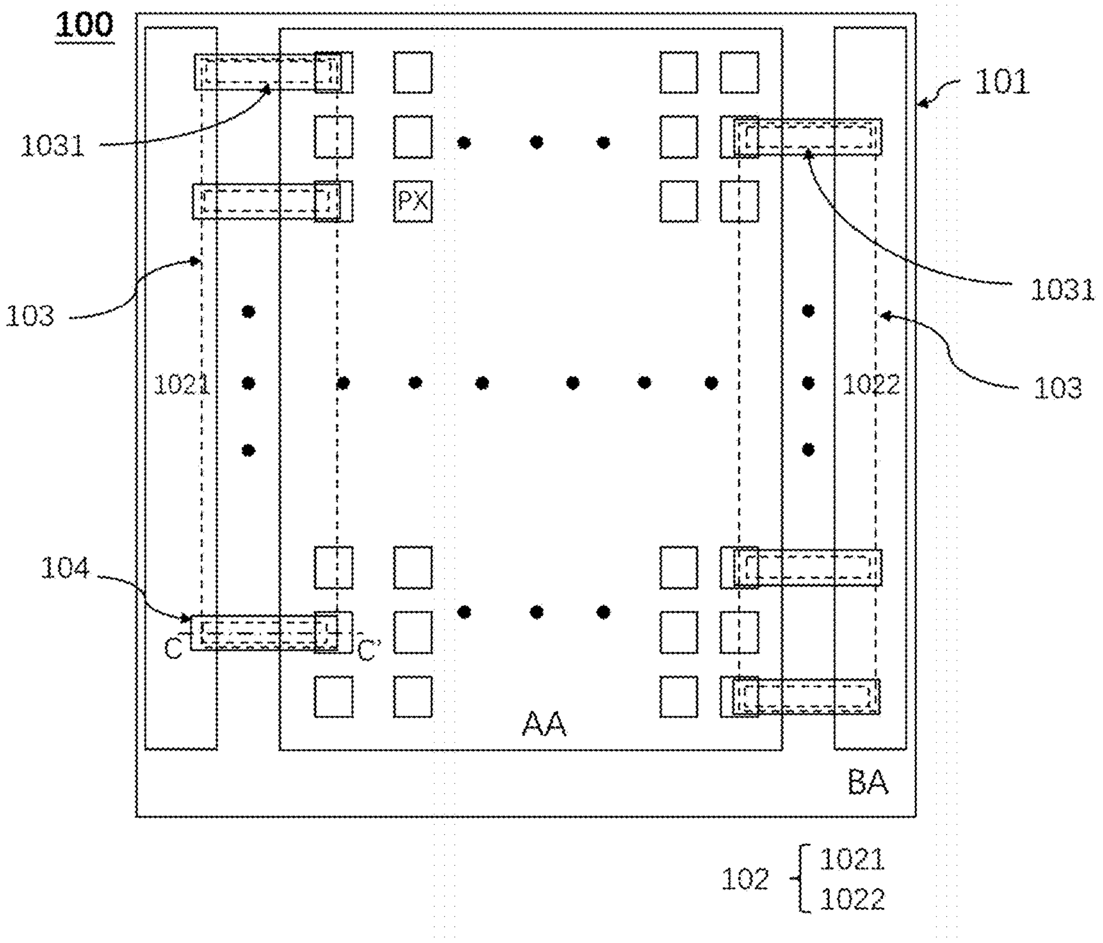
FIG. 1 is a structural diagram of a display panel in one embodiment of the invention.
Figure 2:
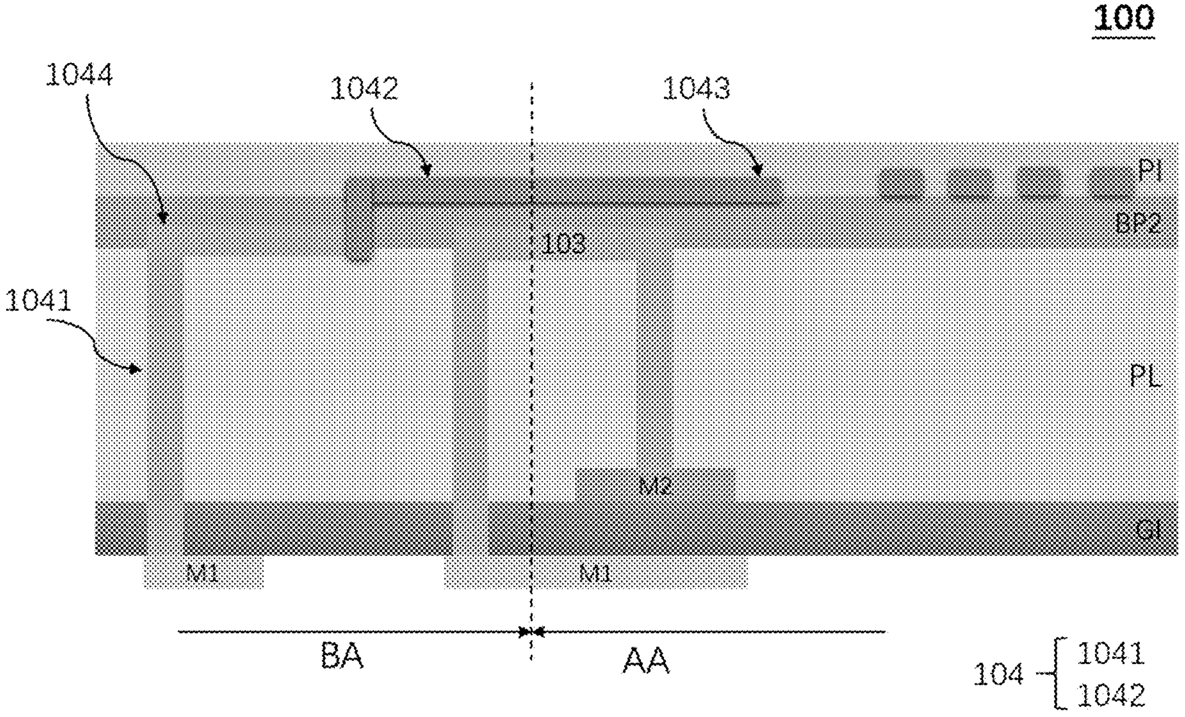
FIG. 2 is a structural diagram along a section line C-C' in FIG. 1.

FIG. 1 is a structural diagram of a display panel in one embodiment of the invention, and FIG. 2 is a structural diagram along a section line C-C' in FIG. 1. As shown in FIGS. 1 and 2, the display panel 100 of this embodiment comprises a substrate 101 having a display area AA and a peripheral area BA adjacent to each other, wherein a plurality of pixel units PX arranged in an array are formed in the display area AA; a gate driving unit 102 provided in the peripheral area BA adjacent to the display area AA; and a connection unit 103 provided between the gate driving unit 102 and the display area AA for electrically connection between the gate driving unit 102 and the plurality of pixel units PX to provide a driving signal to the plurality of pixel units PX. The display panel 100 further comprises a shielding unit 104 at a position corresponding to the connection unit 103. In this embodiment, a projection area of the connection unit 103 on the substrate 101 at least partially overlaps a projection area of the shielding unit 104 on the substrate 101. In order to better shield, the shielding unit 104 is electrically connected to a fixed potential. Preferably, the fixed potential is low potential, and in actual operation, the low potential may be earth potential or common potential. In actual operation, the display panel 100 further comprises a pairing substrate (not shown) and a liquid crystal layer. The substrate 100 is paired with the pairing substrate, and the liquid crystal layer is sandwiched therebetween.

In the display panel 100 of the invention, the gate driving unit 102 is electrically connected to the plurality of pixel units PX through the connection unit 103, and by virtue of design of the shielding unit 104, an electric field formed between the connection unit 103 and the plurality of pixel units PX is avoided to affect redirection of the liquid crystals, thereby avoiding bright spots produced on edges of the display panel 100, and improving display quality of the display panel 100.

In one embodiment, the plurality of plurality of pixel units PX arranged in an array include a first number of rows of pixel units PX, the display panel 100 includes a second number of connection structures 1031, the second number is matched with the first number, such as, the first number or times of the first number, and each connection unit 103 is connected to one row of pixel units PX. In such way, the gate driving unit 102 provides a driving signal to each row of pixel units PX by virtue of the second number of connection structures 1031. Correspondingly, the shielding unit 104 corresponds to the connection unit 103, and also includes the second number, and each shielding unit 104 corresponds to one connection unit 103 to shield each connection structure 1031. In actual operation, the users also may arrange the shielding unit only for a part of the connection structures.

As shown in FIG. 1, in this embodiment, the gate driving unit 102 is provided on both sides of the display area AA. That is, the gate driving unit 102 has a first gate driving circuit 1021 located on one side of the display area AA, and a second gate driving circuit 1022 located on the other side of the display area AA. The plurality of pixel units PX arranged in an array are divided into odd-numbered rows of pixel units connected to the first gate driving circuit 1021, and even-numbered rows of pixel units connected to the second gate driving circuit 1022. At this time, the second number equals to the first number, and the second number of connection structures 1031 includes odd-numbered levels of connection structures located between the display area AA and the first gate driving circuit 1021, and even-numbered levels of connection structures located between the display area AA and the second gate driving circuit 1022. Each odd-numbered level of connection structures is electrically connected to the first gate driving circuit 1021 and one odd-numbered row of pixel units, and each even-numbered level of connection structures is electrically connected to the second gate driving circuit 1022 and one even-numbered row of pixel units. Correspondingly, the second number of shielding units 104 includes odd-numbered levels of shielding units located on one side of the display area AA and even-numbered levels of shielding units located on the other side of the display area AA, each odd-numbered level of shielding units corresponds to one odd-numbered level of connection structures, and each even-numbered level of shielding units corresponds to one even-numbered level of connection structures to shield each connection structure. Similarly with the previous embodiment, in actual operation, the users also may arrange the shielding unit only for a part of connection structures.

In the embodiment of FIG. 1, the first gate driving circuit 1021 is configured to drive the odd-numbered rows of pixel units, and the second gate driving circuit 1022 is configured to drive the even-numbered rows of pixel units. In actual operation, in another embodiment, the first gate driving circuit 1021 and the second gate driving circuit 1022 may be both connected to each row of pixel units PX, such that the first gate driving circuit 1021 and the second gate driving circuit 1022 may together drive each row of pixel units PX from both sides of the display area AA. At this time, the second number may equal to twice of the first number, the first number of connection structures 1031 is located between the display area AA and the first gate driving circuit 1021, and the first number of connection structures 1031 is also located between the display area AA and the second gate driving circuit 1022. Correspondingly, the display panel 100 has the second number of shielding units 104, the first number of shielding units 104 is located on one side of the display area AA, the first number of shielding units 104 is also located on the other side of the display area AA, and each shielding unit corresponds to one connection structure to shield each connection structure. Similarly with the previous embodiment, in actual operation, the users also may arrange the shielding unit only for a part of connection structures.

As for the display panel in other forms, the gate driving unit may be arranged on one or more sides of the display area AA, and also may be arranged surrounding the display area AA, but the invention is not limited thereto. Moreover, connection relations of the connection structure, the shielding unit, the gate driving unit and the plurality of pixel units are similar, and the details are not described here.

In the invention, the connection unit 103 may be configured to connect the gate driving unit 102 and metal layers in the plurality of pixel units PX. As shown in FIG. 2, in this embodiment, the connection structure 1031 is electrically connected to a second metal layer M2 in the gate driving unit 102 and a first metal layer M1 in the plurality of pixel units PX. In actual operation, each row of pixel units PX includes a gate line, the gate line may be formed by the first metal layer M1, and each connection structure 1031 is connected to the gate line of the corresponding row of pixel units PX. The gate driving unit 102 transmits a driving signal to the corresponding gate line via the connection structure 1031 after transmitting the driving signal to the connection structure 103 through the second metal layer M2. The connection structure 1031 is often formed by a first transparent conductive layer IT01, thereby achieving conversion connection between the first metal layer M1 and the second metal layer M2, but the invention is not limited thereto.

In the invention, the shielding unit 104 may comprise a first portion 1041 and a second portion 1042, and the second portion 1042 covers the connection structure 1031. In this embodiment, the second portion 1042 is formed by a second transparent conductive layer IT02, such that the second portion 1042 may be covered on the connection structure 1031 formed by the first transparent conductive layer IT01 to shield the connection structure 1031. The first portion 1041 is formed by the first transparent conductive layer IT01, and the first portion 1041 has one end connected to the second portion 1042, and the other end connected to a conductive layer in the peripheral area BA to receive a fixed potential supplied by the conductive layer, and transfer the received fixed potential to the second portion 1042 in order to ensure the shielding effect of the second portion 1042 on the connection structure 1031. Of course, architecture and material of the first portion 1041 and/or the second portion 1042 are not limited thereto. In actual operation, the peripheral area BA may have a metal layer, and the other end of the first portion 1041 is connected to the metal layer to receive the fixed potential. In this embodiment, the metal layer is the first metal layer M1, and in actual operation, the metal layer also may be the second metal layer M2 or formed together by the first metal layer M1 and the second metal layer M2 through bridging, but the invention is not limited thereto.

Further, as shown in FIG. 2, the plurality of pixel units PX include the second transparent conductive layer ITO2. In this embodiment, the second transparent conductive layer ITO2 may act as a pixel electrode, and in order to better shield the negative voltage electric field formed between the connection structure 1031 and the second transparent conductive layer IT02 in the plurality of pixel units PX, the shielding unit 104 may completely extend beyond and cover the connection structure 1031. That is, a projection area of the connection structure 1031 on the substrate 101 is located in a projection area of the shielding unit 104 on the substrate 101, or the projection area of the connection structure 1031 on the substrate 101 overlaps the projection area of the shielding unit 104 on the substrate 101. Alternatively, the shielding unit 104 at least extends beyond and covers the connection structure 1031 in a direction between the gate driving unit 102 and the display area AA. That is, in the direction between the gate driving unit 102 and the display area AA, the projection area of the connection structure 1031 on the substrate 101 is located in the projection area of the shielding unit 104 on the substrate 101.

Specifically, as shown in FIG. 2, the shielding unit 104 has a first end 1043 and a second end 1044 opposite to each other, the first end 1043 is close to the pixel area AA and extends towards the pixel area AA to go beyond the connection structure 1031, and the second end 1044 is close to the gate driving unit 102 and extends towards the gate driving unit 102 to go beyond the connection structure 1031. The second end 1044 of the shielding unit 104 is electrically connected to a metal layer of the peripheral area BA, and the metal layer is connected to a fixed potential. In this embodiment, the metal layer is the first metal layer M1, and in actual operation, the metal layer also may be the second metal layer M2 or formed together by the first metal layer M1 and the second metal layer M2 through bridging, but the invention is not limited thereto. Preferably, the fixed potential is low potential, and the low potential may be earth potential or common potential.

Figure 3A:
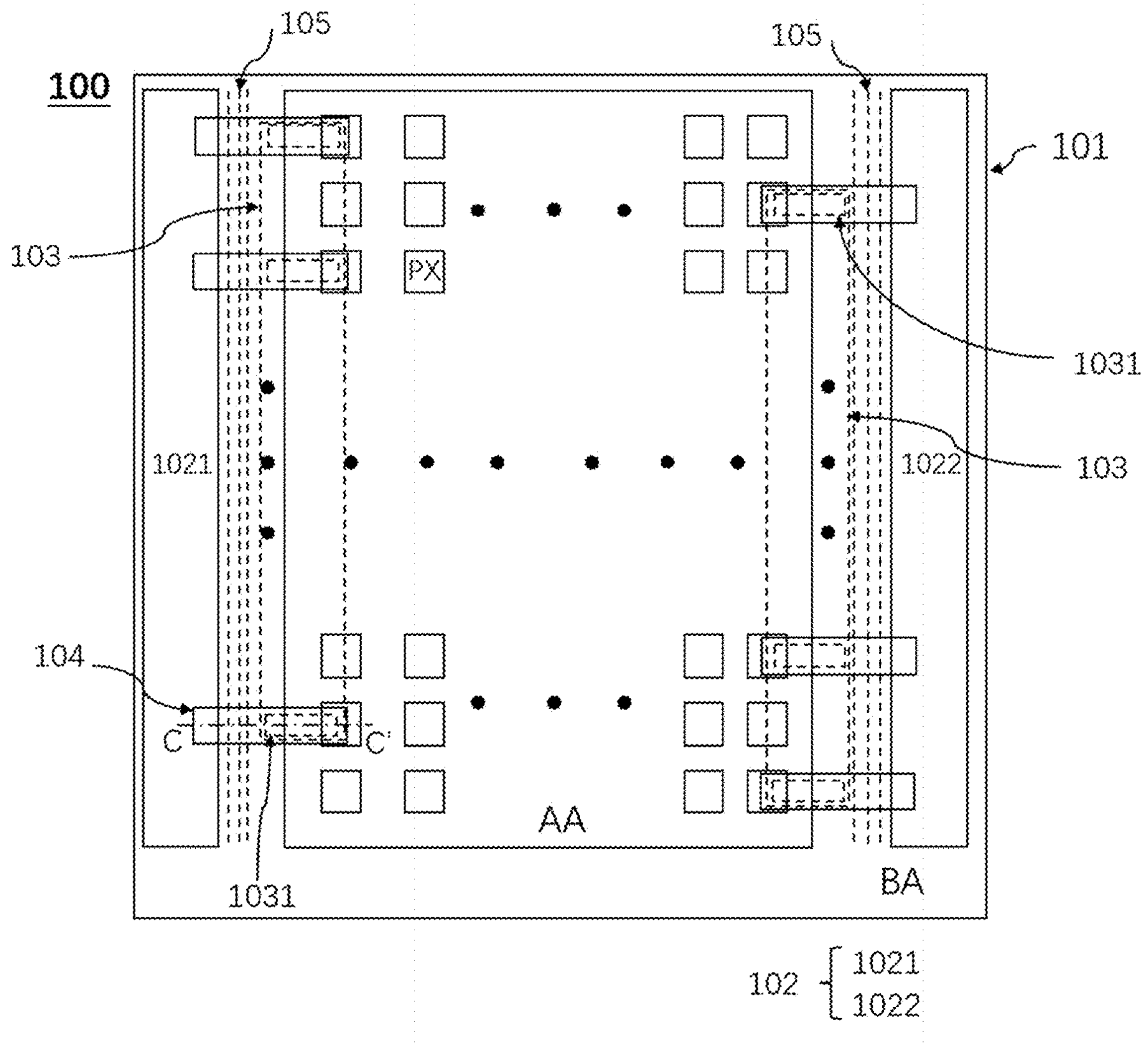
FIG. 3A is a structural diagram of a display panel in another embodiment of the invention.
Figure 3B:
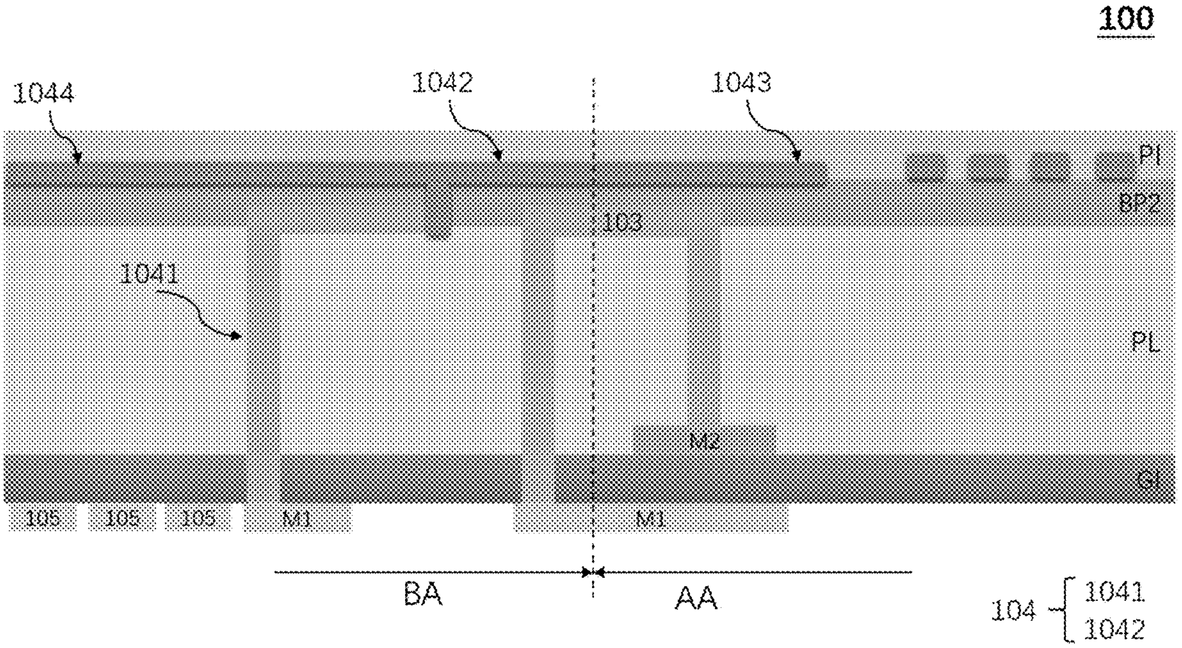
FIG. 3B is a structural diagram along a section line C-C' in FIG. 3A.

FIG. 3A is a structural diagram of a display panel in another embodiment of the invention, and FIG. 3B is a structural diagram along a section line C-C' in FIG. 3A. As shown in FIGS. 3A and 3B, the substrate 101 is further provided with signal conducting wires 105, which are between the gate driving unit 102 and the plurality of pixel units PX of the display area AA. In this embodiment, the shielding unit 104 is further covered on at least a part of the signal conducting wires 105 adjacent to the corresponding connection structures 1031.

Specifically, as shown in FIG. 3B, the shielding unit 104 has a first end 1043 and a second end 1044 opposite to each other, the first end 1043 is close to the pixel area AA and extends towards the pixel area AA to go beyond the connection structure 1031, the second end 1044 is close to the gate driving unit 102 and extends towards the gate driving unit 102 to go beyond the connection structure 1031, and the second end 1044 of the shielding unit 104 is covered on at least a part of the signal conducting wires 105 adjacent to the corresponding connection structures 1031. In this embodiment, the respective signal conducting wires 105 are formed by the first metal layers M1, but in actual operation, the invention is not limited thereto. For example, the respective signal conducting wires 105 also may be formed by the second metal layers M2, or formed together by the first metal layer M1 and the second metal layer M2 through bridging. As shown in FIG. 3B, in this embodiment, the conductive layer for providing the fixed potential to the shielding unit 104 in the peripheral area BA is formed by the first metal layer M1, and located between the signal conducting wire 105 and the display area AA, but in actual operation, the invention is not limited thereto.

To sum up, according to the embodiments of the invention, since the display panel uses the shielding unit, the negative voltage electric field between the connection structure and the pixel unit can be better shielded to avoid light leakage due to incomplete redirection of the liquid crystals or no response of the redirection in the display area, thereby eliminating bright spots produced on long edges of the display panel, and improving display quality and yield of the products.

Of course, the invention may further have various other embodiments, and in the case of not departing from spirit and essence of the invention, those skilled in the art shall make various corresponding modifications and variations according to the invention, but these corresponding modifications and variations shall belong to the scope of protection of the appended claims.

Industrial Applicability

The display panel of the invention has the following advantageous effects:

the negative voltage electric field between the connection structure and the pixel unit can be better shielded to avoid light leakage due to incomplete redirection of the liquid crystals or no response of the redirection in the display area, thereby eliminating bright spots produced on long edges of the display panel, and improving display quality and yield of the products.

REFERENCE SIGNS LIST

100: display panel
101: first substrate
102: gate driving unit
1021: first gate driving circuit
1022: second gate driving circuit
103: connection unit
103: connection structure
104: shielding unit
1041: first portion
1042: second portion
1043: first end
1044: second end
105: signal conducting wire
AA: display area
BA: peripheral area
M1: first metal layer
M2: second metal layer
P1, BP2, PL, GI: interlayer insulating layer

What is claimed is:

1. A display panel, comprising:

a substrate having a peripheral area and a display area adjacent to each other, the display area provided with a plurality of pixel units;

a gate driving unit provided in the peripheral area;

a connection unit provided between the gate driving unit and the display area, and electrically connected to the gate driving unit and the plurality of pixel units; and a shielding unit provided on the connection unit; and a projection area of the connection unit on the substrate corresponds to a projection area of the shielding unit on the substrate, and the shielding unit is electrically connected to a fixed potential;

wherein the shielding unit has a first end and a second end opposite to each other, the first end is close to the display area, the second end is close to the gate driving unit, and the first end extends towards the display area and goes beyond the connection unit.

2. The display panel according to claim 1, wherein the connection unit is electrically connected to a first metal layer in the plurality of pixel unit and a second metal layer in the gate driving unit.

3. The display panel according to claim 1, wherein the plurality of pixel units include a first number of rows of pixel units, the connection unit includes a second number of connection structures, the second number is matched with the first number, and each connection structure is connected to one row of pixel units.

4. The display panel according to claim 1, wherein the gate driving unit has a first gate driving circuit located on one side of the display area, and a second gate driving circuit located on the other side of the display area.

5. The display panel according to claim 1, wherein the connection unit comprises a first transparent conductive layer.

6. The display panel according to claim 1, wherein the shielding unit comprises a first portion, and a second portion covering the connection unit and comprising a second transparent conductive layer.

7. The display panel according to claim 6, wherein the first portion is connected to a conductive layer of the peripheral area and the second portion, and the first portion comprises a first transparent conductive layer.

8. The display panel according to claim 1, wherein the second end is electrically connected to a conductive layer of the peripheral area.

9. The display panel according to claim 1, wherein the fixed potential is a low potential.

10. The display panel according to claim 9, wherein the low potential is earth potential or common potential.

* * * * *